United States Patent
Yoshida et al.

(10) Patent No.: US 9,573,535 B2
(45) Date of Patent: Feb. 21, 2017

(54) WIRING HARNESS

(71) Applicant: YAZAKI CORPORATION, Tokyo (JP)

(72) Inventors: Hiroyuki Yoshida, Kosai (JP); Hideomi Adachi, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 5 days.

(21) Appl. No.: 14/515,669

(22) Filed: Oct. 16, 2014

(65) Prior Publication Data

US 2015/0034382 A1 Feb. 5, 2015

Related U.S. Application Data

(63) Continuation of application No. PCT/JP2013/061703, filed on Apr. 16, 2013.

(30) Foreign Application Priority Data

Apr. 17, 2012 (JP) ................................ 2012-093520

(51) Int. Cl.
| | | |
|---|---|---|
| *H01B 7/00* | (2006.01) | |
| *B60R 16/02* | (2006.01) | |
| *H02G 3/04* | (2006.01) | |
| *H02G 3/32* | (2006.01) | |

(52) U.S. Cl.
CPC ......... *B60R 16/0215* (2013.01); *H02G 3/0406* (2013.01); *H02G 3/0481* (2013.01); *H02G 3/32* (2013.01)

(58) Field of Classification Search
CPC ... H02G 15/18; H01B 7/0045; B60R 16/0207; H01R 4/00
USPC ... 174/110 R, 112, 113 R, 71 R, 72 R, 72 A, 174/74 R
See application file for complete search history.

(56) References Cited

U.S. PATENT DOCUMENTS

| | | | | |
|---|---|---|---|---|
| 4,415,765 A | * | 11/1983 | Iwasa ..................... | H01B 7/365 174/112 |
| 4,424,627 A | * | 1/1984 | Tarbox ................... | H01B 7/368 174/112 |
| 5,911,450 A | * | 6/1999 | Shibata ............... | B60R 16/0207 174/112 |

(Continued)

FOREIGN PATENT DOCUMENTS

| | | |
|---|---|---|
| CN | 101258790 A | 9/2008 |
| CN | 102136706 A | 7/2011 |

(Continued)

OTHER PUBLICATIONS

Office Action dated Nov. 17, 2015, issued by the Japanese Patent Office in counterpart Japanese Application No. 2012-093520.

(Continued)

*Primary Examiner* — William H Mayo, III
(74) *Attorney, Agent, or Firm* — Sughrue Mion, PLLC

(57) ABSTRACT

A wiring harness includes one or a plurality of conductor lines and a conduit member which accommodates therein the conductor line or lines, an identification in a predetermined color being applied to an outer surface of the conduit member. A resin identifying portion is formed on the outer surface of the conduit member by extruding a resin, or a resin sheet material or tape material is wound around the outer surface of the conduit member that is formed as the resin identifying portion.

6 Claims, 4 Drawing Sheets

(56) References Cited

U.S. PATENT DOCUMENTS

| | | | | |
|---|---|---|---|---|
| 6,417,451 | B1* | 7/2002 | Uchiyama | B60R 16/0215 174/72 A |
| 6,437,248 | B1* | 8/2002 | Giebel | G02B 6/4482 174/110 R |
| 7,145,081 | B2* | 12/2006 | Suzuki | H01B 7/36 174/112 |
| 7,423,223 | B2* | 9/2008 | Taira | B60S 1/48 16/2.1 |
| 8,525,029 | B2* | 9/2013 | Kato | B60R 16/0215 174/113 R |
| 9,163,756 | B2* | 10/2015 | Sugiyama | H02G 3/0468 |
| 2005/0011687 | A1 | 1/2005 | Yamaguchi et al. | |
| 2006/0021785 | A1* | 2/2006 | Kamata | H01B 7/361 174/112 |
| 2006/0070766 | A1* | 4/2006 | Katsumata | H01B 13/34 174/112 |
| 2009/0107694 | A1 | 4/2009 | Watanabe | |
| 2011/0155458 | A1 | 6/2011 | Kato et al. | |
| 2014/0216812 | A1 | 8/2014 | Adachi et al. | |

FOREIGN PATENT DOCUMENTS

| | | | |
|---|---|---|---|
| DE | 296 11 830 U1 | 9/1996 | |
| DE | 298 07 441 U1 | 7/1998 | |
| EP | 2 338 741 A2 | 6/2011 | |
| EP | 2773534 | 9/2014 | |
| JP | 07-241015 A | 9/1995 | |
| JP | 2004-224156 * | 8/2004 | .......... 174/72 A |
| JP | 2004-224156 A | 8/2004 | |
| JP | 2006-119459 A | 5/2006 | |
| JP | 2006-149012 A | 6/2006 | |
| JP | 2009-143326 A | 7/2009 | |
| JP | EP 2338741 A * | 6/2011 | .......... 174/72 A |
| JP | 2011-150991 A | 8/2011 | |
| WO | 2007/029801 A1 | 3/2007 | |
| WO | 2013/069709 A1 | 5/2013 | |

OTHER PUBLICATIONS

Office Action dated Nov. 2, 2015, issued by the State Intellectual Property Office of the People's Republic of China in counterpart Chinese Application No. 201380020413.x.

Search Report and Written Opinion dated Jul. 23, 2013 issued by the International Searching Authority in counterpart International Patent Application No. PCT/JP2013/061703.

Communication dated Feb. 15, 2016, issued by the European Patent Office in counterpart European Application No. 13722592.6.

* cited by examiner

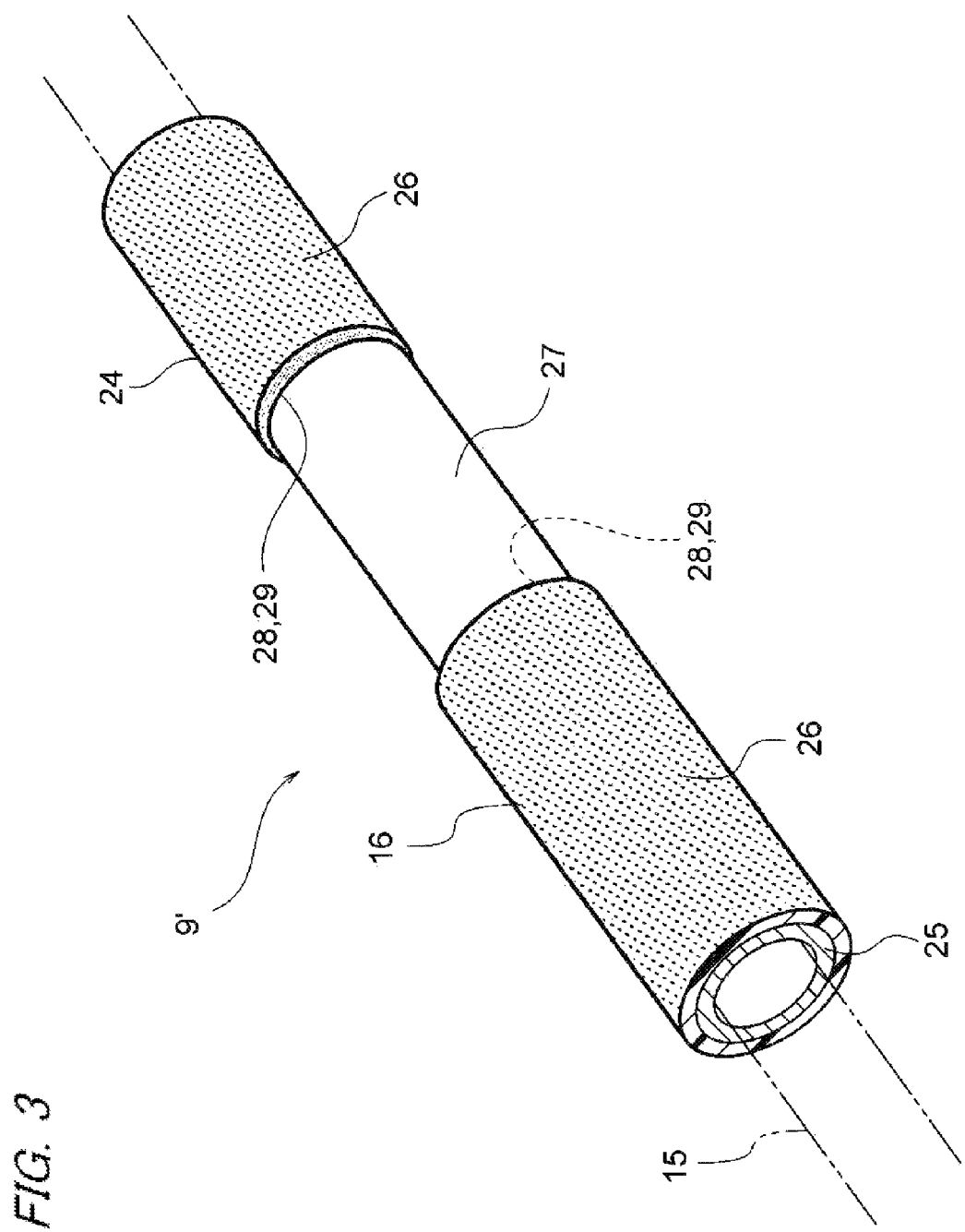

WIRING HARNESS

CROSS REFERENCE TO RELATED APPLICATIONS

This application is a continuation of PCT application No. PCT/JP2013/061703, which was filed on Apr. 16, 2013 based on Japanese Patent Application (No. 2012-093520) filed on Apr. 17, 2012, the contents of which are incorporated herein by reference.

BACKGROUND OF THE INVENTION

1. Field of the Invention

The present invention relates to a wiring harness including a conduit member which accommodates therein a conductor line.

2. Description of the Related Art

A wiring harness is provided in a mobile means such as a motor vehicle to electrically connect equipment mounted. A wiring harness described in JP-A-2004-224156 below includes three high tension electric wires and three metallic conduit members (metallic pipes) which accommodate individually the three high tension electric wires for protection. The high tension electric wires are provided to connect a motor mounted in a front portion of a vehicle and an inverter mounted in an intermediate or rear portion of the vehicle.

The wiring harness is laid to extend along an underside of a body floor which constitutes an outer side of a body frame. Because of this, as the metallic conduit members, a material is adopted which can protect the high tension electric wires from small stones driven or water splashed thereagainst by the vehicle. The metallic conduit members have such rigidity as to protect the high tension electric wires from such small stones or water and to prevent the deflection of the high tension electric wires.

SUMMARY OF THE INVENTION

A wiring harness that is laid out in an electric vehicle or a hybrid vehicle carries a higher-voltage current than a current carried by a general wiring harness. Consequently, the wiring harness carrying such a higher-voltage current is colored in a predetermined color (an orange color) with a view to issuing a warning about the higher-voltage current. In the case of the wiring harness disclosed in JP-A-2004-224156, although no specific description thereabout is made therein, it is considered that the metallic conduit member is colored orange to warn of the flowing of a high-voltage and high-ampere current.

Incidentally, since the wiring harness including the metallic conduit member colored orange is also laid outside a passenger compartment (on an underside of a body floor), a severe quality of environmental resistance is required of paint, and hence, the wiring harness has a problem that the painting cost becomes very high.

The invention has been made in view of these situations, and an object thereof is to provide a wiring harness which can provide inexpensively an identification that warns of the flowing of high-voltage current.

According to one aspect of the present invention, there is provided a wiring harness including one or a plurality of conductor lines and a conduit member which accommodates therein the conductor line or lines, an identification in a predetermined color being applied to an outer surface of the conduit member, wherein a resin identifying portion is formed on the outer surface of the conduit member by extruding a resin, or a resin sheet material or tape material is wound around the outer surface of the conduit member that is formed as the resin identifying portion.

Thus, according to the invention characterized in the way described above, the resin identifying portion is formed on the outer surface of the conduit member. The resin identifying portion is the portion which is colored by the resin in the predetermined color to identify itself as the caution, and by forming the resin identifying portion, it becomes possible to issue a warning about a high-voltage and high-ampere current. The resin identifying portion is made from resin, and hence, the coloring can be facilitated. The resin identifying portion is formed by extruding a resin or by winding the resin sheet material or tape material around the outer surface of the conduit member, and with these forming processes adopted, the identification can be applied inexpensively to the outer surface of the conduit member. Compared with painting, for example, the extrusion of resin can deal easily with the required environmental resistance quality.

The resin identifying portion may be provided over a full longitudinal length of the conduit member or provided partially on the conduit member.

According to the invention characterized in this way, when the resin identifying portion is provided over the full longitudinal length of the conduit member, it is possible to issue a warning about a high-voltage current even though the wiring harness is viewed in any direction. In addition, when the resin identifying portion is provided partially on the conduit member, a warning about the high-voltage current can be given only to locations which require the identification.

The partial application of the resin identifying portion is effective, for example, when a fixing clamp is provided. This is because even though the resin identifying portion is applied to a location where a fixing clamp is to be attached, the resin identifying portion is hidden or covered by the fixing clamp attached. Thus, there is no reason for the application of the resin identifying portion to such a location. In addition, it is also effective to provide the resin identifying portion only on the straight portions of the conduit member, excluding the bent portions. This is because this facilitates the bending work of the conduit member. Providing the resin identifying portion near the bent portion is good enough to issue a warning about the high-voltage current. The partial application of the resin identifying portion is also effective to reduce the material costs.

According to the invention, since the resin identifying portion is formed by extruding the resin or by winding the resin sheet material or tape material, it is easy to provide the resin identifying portion partially. In contrast with this, when painting is adopted, since such a treatment as masking becomes necessary, it is troublesome to paint the conduit member partially. Thus, the invention is effective.

According to one aspect of the invention, since the process of forming the resin identifying portion using the resin is adopted, there is provided an advantage that the application of the identification that identifies the wiring harness as carrying the high-voltage current can be implemented more inexpensively than in the conventional wiring harness.

According to another aspect of the invention, in addition to the above mentioned advantage, the following advantage is provided. Namely, an advantage is provided that the resin identifying portion can be provided according to locations requiring a caution or warning. By adopting this approach, it is advantageously possible to give a warning only to locations requiring it.

BRIEF DESCRIPTION OF THE DRAWINGS

FIGS. 1A to 1C show a wiring harness of the invention, of which FIG. 1A shows a layout of the wiring harness, FIG. 1B shows the configuration of the wiring harness, and FIG. 1C is an enlarged view of an encircled portion I in FIG. 1B.

FIG. 3 is a perspective view of a resin identifying portion and a non-identifying portion which are provided on an outer surface of a conduit member.

DETAILED DESCRIPTION OF THE EXEMPLARY EMBODIMENTS

A wiring harness includes one or a plurality of conductor lines and a conduit member which accommodates therein the conductor line or lines. A resin identifying portion is provided on an outer surface of the conduit member, and the resin identifying portion is colored in such a predetermined color as to identify the wiring harness as a wiring harness through which a high-voltage and high-ampere current flows. The resin identifying portion is provided on the conduit member so as to extend along a full longitudinal length thereof. Alternatively, resin identifying portions are provided partially on the conduit member. The resin identifying portion is formed by extruding a resin. Alternatively, a resin sheet material or tape material is wound around a portion of the conduit member where a resin identifying portion is to be formed.

Embodiment 1

Figure 1A:
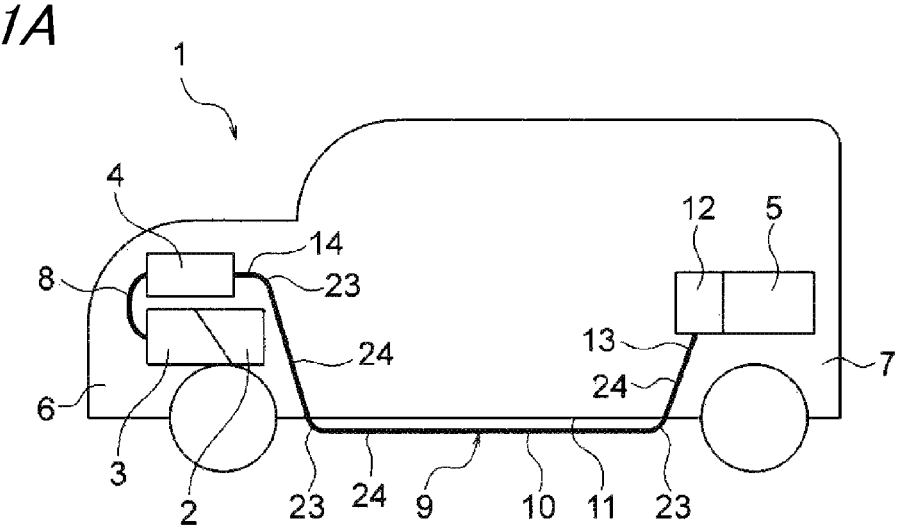
Figure 1B:
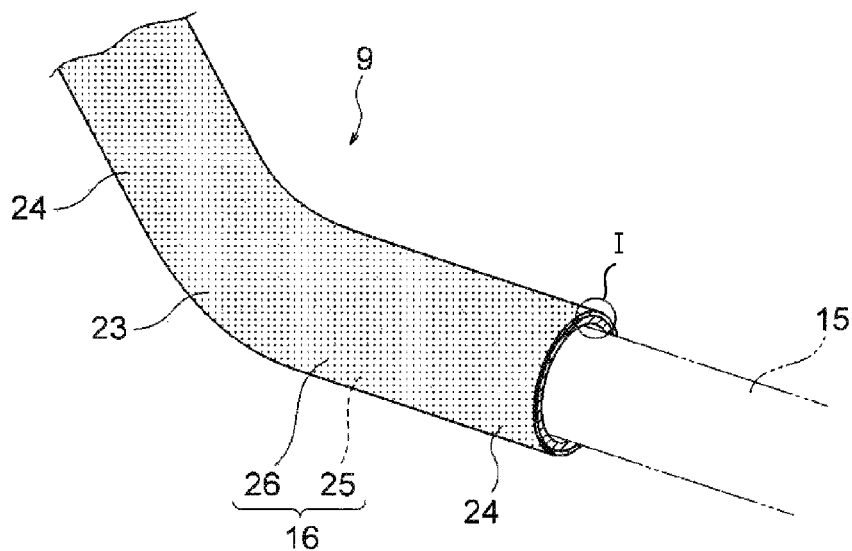
Figure 1C:
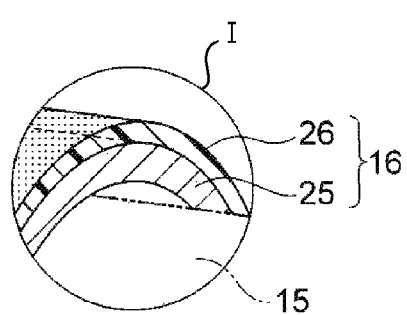
Figure 2A:
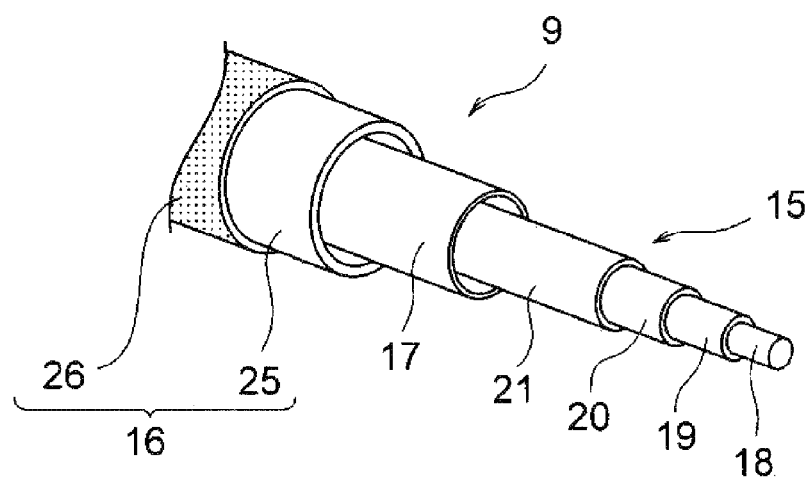
FIGS. 2A to 2C show configurations of conductor lines of the wiring harness.
Figure 2B:
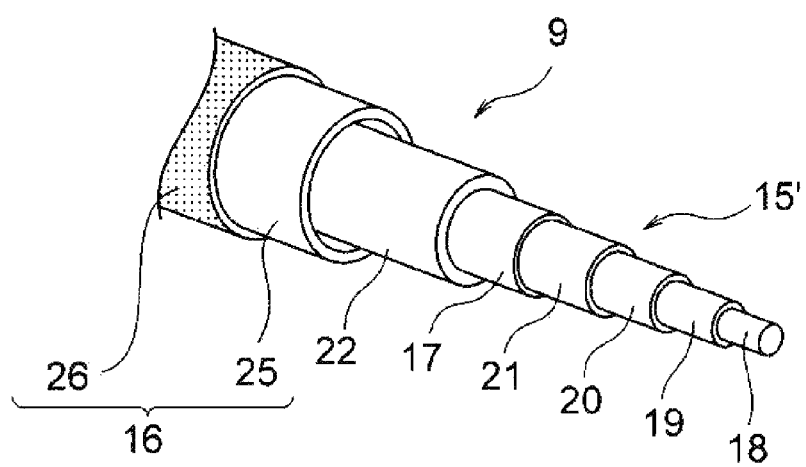
Figure 2C:
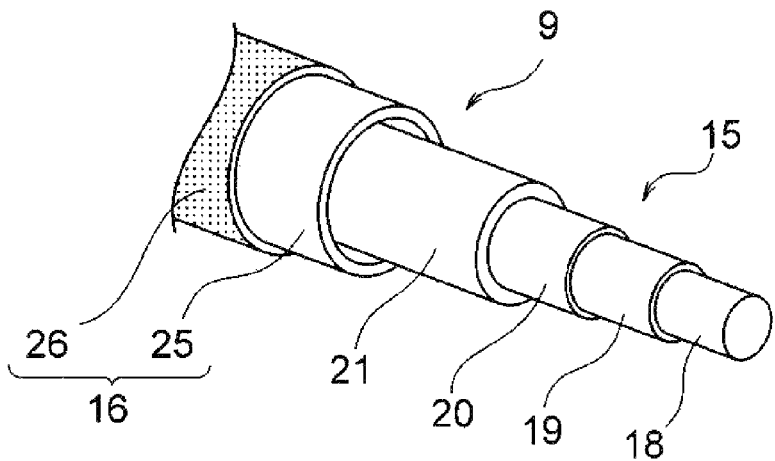

Hereinafter, Embodiment 1 will be described by reference to the drawings. FIGS. 1A to 1C show a wiring harness of the invention, of which FIG. 1A shows a layout of the wiring harness, FIG. 1B shows the configuration of the wiring harness, and FIG. 1C is an enlarged view of an encircled portion I in FIG. 1B. Further, FIGS. 2A to 2C show configurations of conductor lines of the wiring harness.

In this embodiment, the invention will be described as being applied to a wiring harness which is laid out on a hybrid vehicle (or to a wiring harness which is laid out on an electric vehicle or a general vehicle with an internal combustion engine).

In FIG. 1A, reference numeral 1 denotes a hybrid vehicle. A hybrid vehicle 1 is a vehicle which is driven by power from a combination of such power sources as an engine 2 and a motor unit 3. Electric power from a battery 5 (a battery pack) is supplied to the motor unit 3 via an inverter unit 4. In this embodiment, the engine 2, the motor unit 3 and the inverter unit 4 are mounted in an engine compartment 6 which is situated where front wheels are fitted. In addition, the battery 5 is mounted in a rear portion 7 of the vehicle 1 which is situated where rear wheels are fitted (or may be mounted within a passenger compartment of the vehicle 1 which is situated behind the engine compartment 6).

The motor unit 3 and the inverter unit 4 are connected by a high tension wiring harness 8. Additionally, the battery 5 and the inverter unit 4 are also connected by a high tension wiring harness 9. An intermediate portion 10 of the wiring harness 9 is laid out on an underside or ground side of a body floor 11. The wiring harness 9 is laid out substantially parallel along the body floor 11. The body floor 11 is a known body and a so-called panel member, and a through hole (whose reference numeral is omitted) is formed in predetermined positions on the body floor 11. The wiring harness 9 is passed through the through holes formed.

The wiring harness 9 and the battery 5 are connected via a junction box 12 provided in the battery 5. A rear end 13 of the wiring harness 9 is connected electrically to the junction box 12 using a known method. A front end 14 of the wiring harness 9 is connected electrically to the inverter unit 4 using a known method.

The motor unit 3 includes a motor and a generator. Additionally, the inverter unit 4 includes an inverter and a converter. The motor unit 3 is formed as a motor assembly which includes a shield case. In addition, the inverter unit 4 is formed as an inverter assembly which includes a shield case. The battery 5 is an Ni-MH or Li-ion based battery and is formed as a modular unit. It should be noted that it is possible to use a battery unit such as a capacitor, for example. There is imposed no specific limitation on the type of a battery 5 used, provided that a battery can be used in the hybrid vehicle 1 or an electric vehicle.

Hereinafter, the configuration and construction of the wiring harness 9 will be described with reference to FIGS. 1B and 1C. The wiring harness 9 is a high tension member which connects electrically the inverter unit 4 and the battery 5 as described above. The wiring harness 9 is made up of a high tension coaxial composite conductor line 15 (a conductor line), a sheathing member 16 and an electromagnetic shield member 17 (refer to FIG. 2), which will be described later. The wiring harness 9 is laid out in predetermined positions including the underside of the body floor 11 by utilizing clamps 30 (retrofit members).

In FIG. 2A, a high tension coaxial composite conductor line 15 is configured so that the single conductor line 15 has both a positive circuit and a negative circuit. Namely, the high tension coaxial composite conductor line 15 is configured so as to have the circuits of two systems. Specifically, the high tension coaxial composite conductor line 15 is configured so as to include a first conductor line 18 positioned in the center of the conductor line 15 and having a circular cross section, a first insulator 19 which covers an outer circumference of the first conductor line 18 in a predetermined thickness, a second conductor line 20 which is provided on an outer side of the first insulator 19 and a second insulator 21 which covers an outer circumference of the second conductor line 20 in a predetermined thickness. A tubular electromagnetic shield member 17 is interposed between the high tension coaxial composite conductor line 15 and a sheathing member 16. The electromagnetic shield member 17 is made of a known braid or metallic foil and is formed so as to be placed on the high tension coaxial composite conductor line 15 slightly loosely or with a slight gap defined therebetween (or the electromagnetic shield member 17 may be wound around an outer circumference of the second insulator 21 so as to be tightly attached thereto).

In FIG. 2B, a high tension coaxial composite conductor line 15' is a modified example to the high tension coaxial composite conductor line 15 shown in FIG. 2A and includes a first conductor line 18, a first insulator 19, a second conductor line 20, a second insulator 21, an electromagnetic shield member 17 which is provided on an outer side of the second insulator 21 and a sheath 22 which covers an outer circumference of the electromagnetic member 17 in a predetermined thickness.

FIG. 2C shows a modified example to the high tension coaxial composite conductor line 15 shown in FIG. 2A in which a sheathing member 16 makes up a shield member by itself, and an electromagnetic shield member 17 (which is omitted from the drawing) is connected to an end of the shielding member 16.

In addition to the high tension coaxial composite conductor line 15 (15') described above, a known high tension electric wire including a conductor and an insulator, a shielded wire and a cabtyre cable can be raised as a conductor line.

In FIGS. 1B to 2C, the sheathing member 16 is a tubular member which is intended to accommodate and protect the high tension coaxial composite conductor line 15 (15') and has bent tubular portions 23 and straight or non-bent tubular portions 24. The bent tubular portions 23 are produced as bent portions when the wiring harness 9 is laid out along a predetermined line, and the non-bent tubular portions 24 are left as straight or non-bent portions when the wiring harness 9 is laid out so. In this embodiment, the sheathing member 16 formed as described above has a circular cross section (the cross section is not limited to the circular cross section and hence may be oval or elliptic).

The sheathing member 16 includes a conduit member 25 and a resin identifying portion 26 which is provided so as to cover an outer surface of the conduit member 25. The conduit member 25 is formed by extruding a metal, for example. In this embodiment, the conduit member 25 has a circular cross section. In this embodiment, for example, an aluminum pipe (one of examples) is adopted as the conduit member 25. A bore diameter of the conduit member 25 is set to such a dimension as to accommodate therein only a conductor line like the high tension coaxial composite conductor line 15 (refer to FIG. 2), and an outside diameter thereof is set to a small diametrical dimension while taking the strength thereof into consideration.

The identifying portion 26 is a portion which is colored orange to indicate that a high tension conductor line is accommodated in the sheathing member 16 (no specific limitation being imposed on the color, hence allowing any predetermined color to be used). In this embodiment, the identifying portion 26 is formed by extruding a resin material (for example, polypropylene (PP)). The resin identifying portion 26 is provided over a full longitudinal length of the conduit member 25. It should be noted that the resin identifying portion 26 may be formed by winding a resin sheet material or tape material around the outer surface of the conduit member 25.

The resin material is not limited to PP, and hence, a resin material of such a grade as to satisfy the required environmental resistance quality should be selected as required. In addition to the material of the resin identifying portion 26, the thickness of the resin identifying portion 26 should be determined while taking into consideration the outside diameter and bending of the sheathing member 16.

In forming the resin identifying portion 26 through extrusion molding, the following process is effective and simple. A straight conduit member 25 is prepared, and this conduit member 25 is passed through an extruding machine, not shown. When the conduit member 25 is being passed through the extruding machine, a molten resin material is extruded from all circumferential directions to an outer surface of the conduit member 25 so that a resin identifying portion 26 is formed on the outer surface of the conduit member 25. After the resin identifying portion 26 is formed so, bent tubular portions 23 should be formed by using, for example, a bending machine, not shown.

To summarize the sheathing member 16, the resin identifying portion 26 is formed on the outer surface of the conduit member 25. Since a high-voltage and high-ampere current flows through the wiring harness 9, the warning about the high-voltage and high-ampere current can be issued by the resin identifying portion 26 which is colored in the predetermined color (the orange color). The resin identifying portion 26 is formed by extruding the resin, and by using the extrusion molding process, the identification can be applied inexpensively to the outer surface of the conduit member 25. Thus, the required environmental resistance quality can easily be dealt with compared with painting, for example.

Embodiment 2

Figure 4:
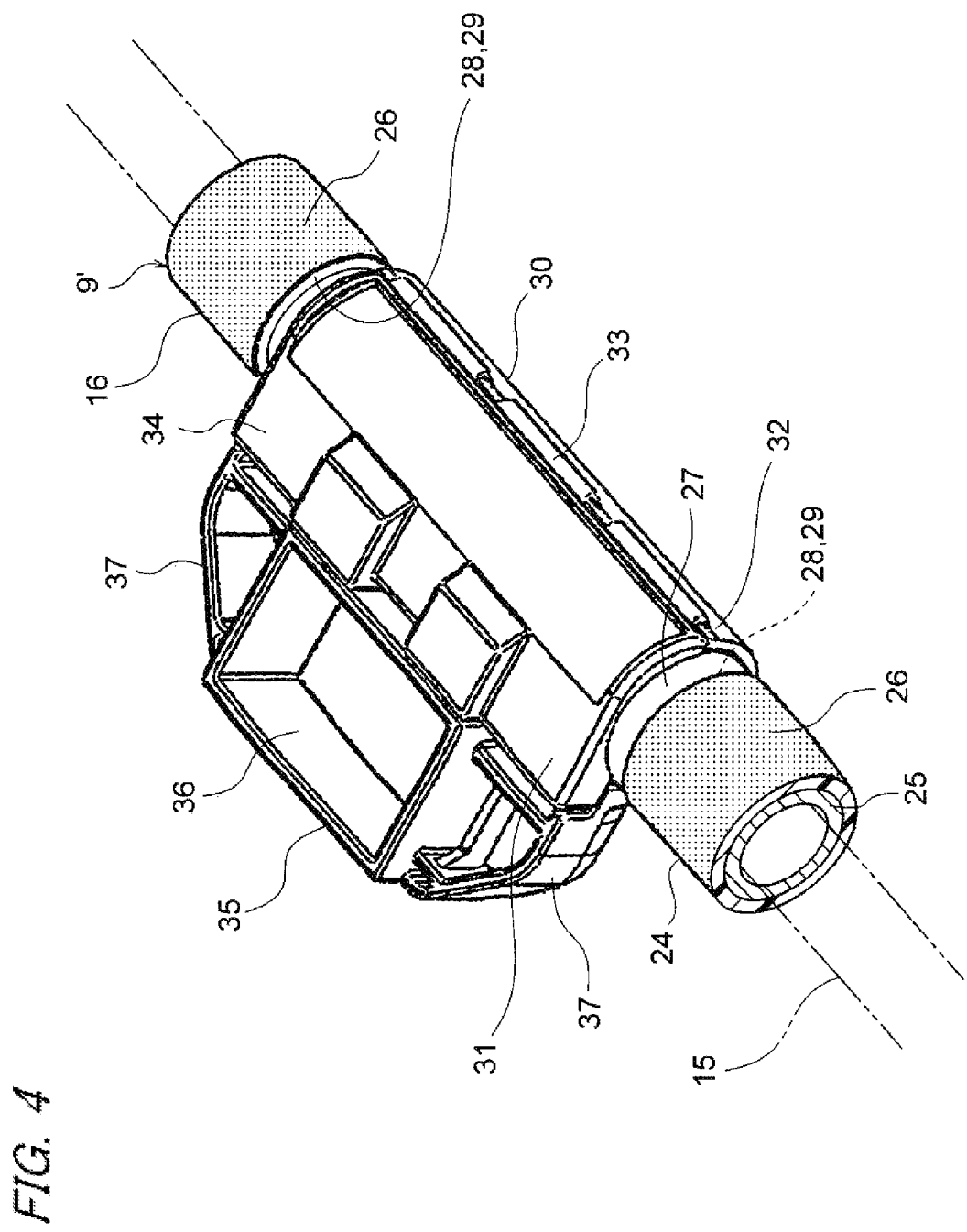
FIG. 4 is a perspective view showing a state in which a clamp is retrofitted to the non-identifying portion.

Hereinafter, referring to the drawings, Embodiment 2 will be described. FIG. 3 is a perspective view of a resin identifying portion 26 and a non-identifying portion 27 which are provided on an outer surface of a conduit member. In addition, FIG. 4 is a perspective view showing a state in which a clamp is retrofitted to the non-identifying portion. It should be noted that like reference numerals will be given to basically like constituent members to those of Embodiment 1, and a detailed description thereof will be omitted here.

In FIG. 3, a sheathing member 16 includes a conduit member 25, resin identifying portions 26 which are provided so as to cover an outer surface of the conduit member 25 and non-identifying portions 27 which are portions where resin identifying portions 26 are not provided circumferentially on the conduit member 25. The sheathing member 16 of Embodiment 2 includes the resin identifying portions 26 which are provided partially on the conduit member 25.

Since the non-identifying portions 27 are the portions where no identifying portion 26 is provided as described above, the outside diameter of the sheathing member 16 is reduced at the non-identifying portions 27. Then, the outside diameter of the sheathing member 16 is reduced so, a level difference 28 is produced between the identifying portion 26 and the non-identifying portion 27. The level difference 28 corresponds to the thickness of the identifying portion 26. The level difference 28 is used as a position restricting portion 29 for a clamp 30 (refer to FIG. 4), that is, the level difference 28 is used as a portion which restricts the position of the clamp 30. The level difference 28 acting as the position restricting portion 29 not only prevents a positional displacement of the clamp 30 but also facilitates the positioning of the clamp 30. In addition, in the case of the clamp 30 being able to move, the level difference 28 can restrict the moving range of the clamp 30.

In forming the resin identifying portions 26 and the non-identifying portions 27, similar to Embodiment 1, the following process is effective and simple. A straight conduit member 25 is prepared, and this conduit member 25 is passed through an extruding machine, not shown. When the conduit member 25 is being passed through the extruding machine, a molten resin material is extruded or not extruded from all circumferential directions to an outer surface of the conduit member 25 so that resin identifying portions 26 are formed on the outer surface of the conduit member 25 or the outer surface of the conduit member 25 is exposed.

It should be noted that when forming resin identifying portions 26 by winding a resin sheet material around the outer surface of the conduit member 25, sheet materials are prepared which are cut to a length corresponding to an extent over which a caution is given, these sheet materials are wound around the straight conduit member 25 or the conduit member 25 which are bent as required, and the resin sheet materials so wound are fixed in place with a tape or a band, for example. When the resin identifying portions 26 are formed not by winding the resin sheet material but by winding a resin tape material, the resin tape material should be wound around the outer surface of the conduit member 25 to an extent over which a caution is given so as to partially overlap and then be fixed thereto.

In FIG. 4, a clamp 30 is retrofitted to the non-identifying portion 27. In laying out a wiring harness 9', the clamp 30 is fixed to a stud bolt, not shown, planted in the body floor 11 (refer to FIG. 1A).

The clamp 30 includes a clamp fixing portion (whose illustration is omitted) functioning as a portion which works with the stud bolt, not shown, and a clamp main body 31 functioning as a portion which works with the sheathing member 16 and is formed so that the clamp fixing portion and the clamp main body 31 are integrated into one unit. The clamp fixing portion, not shown, is assembled to a fixing portion base 35, which will be described later, of the clamp main body 31.

The clamp 30 is made from resin and may be colored according to the sheathing member 16 or an attaching portion thereon, or the form of the wiring harness 9'. Namely, the clamp 30 may function as an identifying member by itself.

The clamp main body 31 has a lower main body portion 32, a hinge 33, an upper main body portion 34, and a pair of lock portions (whose illustration is omitted) which locks the lower main body portion 32 and the upper main body portion 34 together and is formed into a substantially cylindrical shape. The fixing portion base 35 is formed integrally on a side middle portion of the clamp main body 31. A clamp fixing portion, not shown, is accommodated in an accommodating space 36 in the fixing portion base 35. The fixing portion base 35 is protected by a pair of cover portions 37 projecting from both ends of the side portion of the clamp main body 31.

In addition to the clamp 30 described above, as a retrofit member, for example, a known protector or grommet can be raised.

In the sheathing member 16 of Embodiment 2, since the resin identifying portions 26 are provided partially on the outer surface of the conduit member 5, the sheathing member 16 is, of course, effective to be used together with the retrofit member and also provides an advantage that a caution can be displayed only on required portions on the conduit member 25.

It is apparent that various modifications can be made in the invention within a scope not deviating from the gist of the invention.

The present invention is useful for providing a wiring harness which can provide inexpensively an identification that warns of the flowing of high-voltage current.

What is claimed is:

1. A wiring harness including one or a plurality of conductor lines and a metallic conduit member which accommodates therein the conductor line or lines, wherein:
   a cylindrical resin identifying portion is formed on the outer surface of the conduit member by extruding a resin, such that the cylindrical resin identifying portion and a non-identifying portion are respectively formed by extrusion and non-extrusion of the resin, and
   an entire inner surface of the cylindrical resin identifying portion contacts an entire outer surface of the metallic conduit member.

2. The wiring harness according to claim 1, wherein the cylindrical resin identifying portion is provided over a full longitudinal length of the conduit member.

3. The wiring harness according to claim 1, wherein the cylindrical resin identifying portion is provided partially with respect to a longitudinal direction on the conduit member.

4. The wiring harness according to claim 1, wherein a clamp is fitted to the non-identifying portion without contacting the cylindrical resin identifying portion.

5. A wiring harness, comprising
   one or a plurality of conductor lines; and
   a metallic conduit member which accommodates therein the conductor line or lines;
   at least one identification portion in a predetermined color covering an outer surface of the conduit member in at least one predetermined longitudinal location such that the wiring harness has at least one identifying portion corresponding to the position at which the identifying portion is provided and at least one non-identifying portion corresponding to positions at which the at least one identifying portion is not provided, wherein:
   the identifying portion includes a colored extruded resin provided on the outer surface of the conduit member in the at least one predetermined longitudinal location, such that the resin identifying portion and a non-identifying portion are respectively formed by extrusion and non-extrusion of the resin, and
   an entire inner surface of the cylindrical resin identifying portion contacts an entire outer surface of the metallic conduit member.

6. The wire harness of claim 5, wherein there are provided a plurality of identifying portions and non-identifying portions alternately disposed.

* * * * *